(12) United States Patent
Kouno et al.

(10) Patent No.: US 6,198,715 B1
(45) Date of Patent: Mar. 6, 2001

(54) DISC DEVICE HAVING DISC IN BALANCE CORRECTING ARRANGEMENTS

(75) Inventors: Takashi Kouno; Yoshihiro Sato; Yoshiaki Yamauchi; Shozo Saegusa, all of Ibaraki-ken; Shigeki Mori, Yokohama; Shinobu Yoshida, Tsuchiura; Hisahiro Miki, Hitachinaka; Kuniyuki Kimura, Chigasaki, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 08/932,363

(22) Filed: Sep. 17, 1997

(30) Foreign Application Priority Data

Sep. 19, 1996 (JP) .................................................. 8-244447
Apr. 19, 1997 (JP) .................................................. 9-105726

(51) Int. Cl.[7] .................................................. G11B 33/08
(52) U.S. Cl. .................................................. 369/263; 369/247
(58) Field of Search .................................................. 369/247, 251, 369/254, 263, 264, 266; 360/98.07, 98.08, 99.04, 99.05, 99.08, 99.12

(56) References Cited

U.S. PATENT DOCUMENTS

| | | | |
|---|---|---|---|
| 5,260,929 | * 11/1993 | Naoki et al. .................................................. | 369/118 |
| 5,379,990 | * 1/1995 | Ando et al. .................................................. | 369/247 X |
| 5,636,081 | * 6/1997 | Higashiya et al. .................................................. | 360/97.02 |
| 5,737,304 | * 4/1998 | Soga et al. .................................................. | 369/247 |
| 5,903,540 | * 5/1999 | Ro et al. .................................................. | 369/263 |

FOREIGN PATENT DOCUMENTS

| | | |
|---|---|---|
| 57-20915 | * 2/1982 | (JP) . |
| 62-24052 | * 2/1987 | (JP) . |
| 3-86968 | 4/1991 | (JP) . |
| 10-83622 | 3/1998 | (JP) . |

* cited by examiner

Primary Examiner—William R. Korzuch
(74) Attorney, Agent, or Firm—Antonelli, Terry, Stout & Kraus, LLP

(57) ABSTRACT

A disc device which includes a rotary drive mechanism for rotating a replaceable recording medium. An unbalance correcting mechanism adapted to correct unbalance is incorporated in a rotary body rotating unit in the rotary drive mechanism, and includes a holding system having a holding member for holding the rotary drive mechanism and a head having at least a reproducing function. Further included is a support member composed of resilient members, for supporting a casing and a unit holder to each other. The holding system has a natural frequency higher than 30 Hz but lower than 70 Hz, and exhibits a transmission characteristic having a lift-up degree of higher than 8 dB at a resonant point.

7 Claims, 10 Drawing Sheets

0: BEARING ROTATING CENTER
S: DISC ROTATING CENTER
G: CENTER OF GRAVITY

IN CASE OF $\omega_n > \omega$

IN CASE OF $\omega > \omega_n$

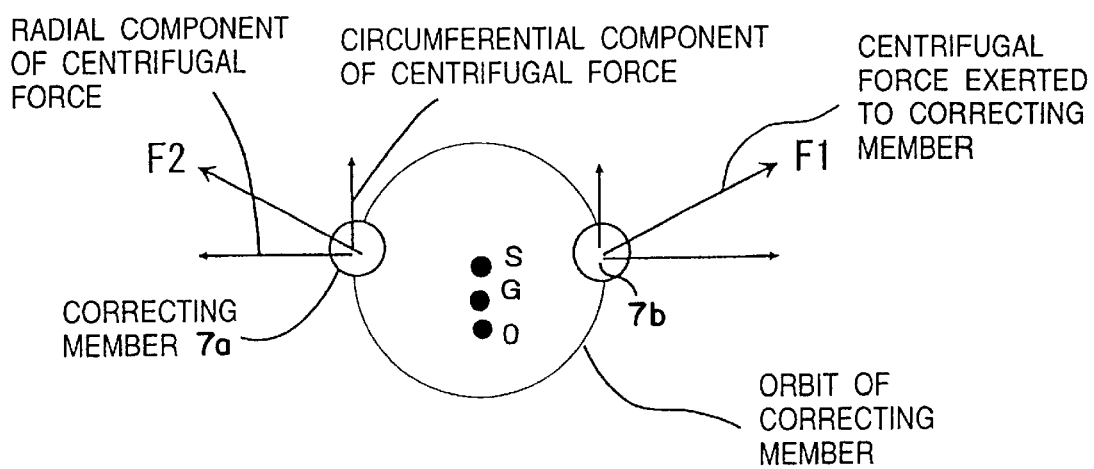
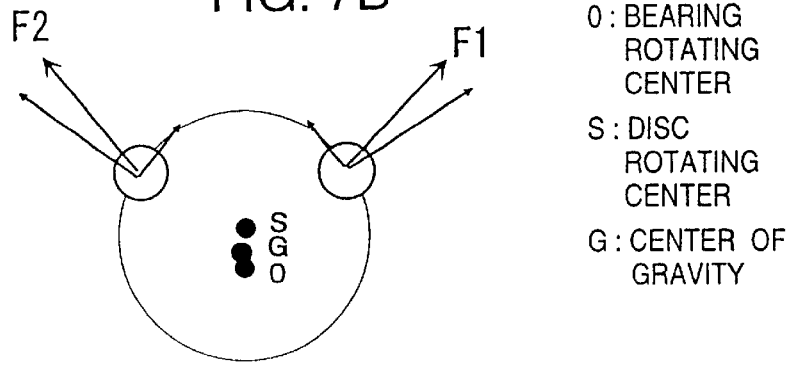
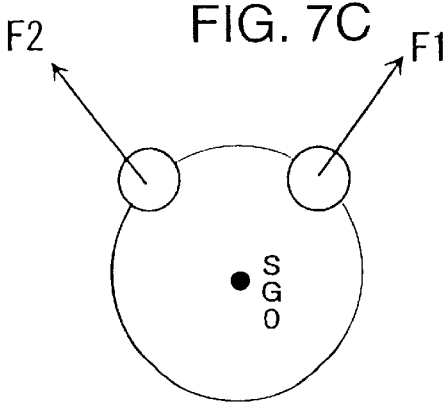

LESS THAN 180 DEGREES

DISC DEVICE HAVING DISC IN BALANCE CORRECTING ARRANGEMENTS

BACKGROUND OF THE PRESENT INVENTION

The present invention relates to a disc device which rotates a disc-like replaceable recording medium at a high speed so as to carry out at least reproduction of data, such as, a disc removable type disc device for CD-ROM, DVD, MO, removable HDD or the like, and in particular to a disc device which is effective at a high rotational speed.

A conventional CD-ROM device is composed of a rotary system for rotating a disc, and a pick-up system for reading data from the disc. On the disc, spiral or concentric recording pits are formed, onto which laser is projected from the pick-up system which is driven radially of the disc, and data are read through the reflection thereupon. The radial recording pitches of these recording pits are very fine, that is, 1.6 μm, and highly precise positioning is required between the disc and the pick-up.

The following two problems are main factors which cause hindrance to positioning accuracy.

(1) Vibration caused by the spindle drive system and the pick-up drive system; and (2) External disturbance exerted from the outside.

The typical those of the problems stated in (1) are unbalance vibration of a rotary system, electromagnetic vibration of a motor or drive reaction of a pick-up drive system. It is most important to ensure a required degree of positioning accuracy under the presence of these factors when designing the device. In particular, the unbalance vibration of the rotary system have been being materialized since the speed of rotation of a disc has been rapidly increased due to requirement of high speed data transfer. Accordingly, as disclosed in Japanese Laid-Open Patent No. H3-86968, balance correction using fluid has been proposed.

It has been desired to increase the data transfer speed of the disc device due to the materialization of multi-media which concerns a large capacity of data of image or motion picture. The higher the rotational speed of a disc in a disc device, the higher the data transfer speed. Accordingly, these years, the rotational speed of an the disc has been being rapidly increased.

The most serious problem which should be overcome for increasing the rotational speed of a disc, is an increase in unbalance vibration. Different from a hard disc device, an optical disc device for CD-ROM or the like is essential in view of the compatibility of a disc as a recording medium used therein. Since the disc is mass-producible by pressing, the manufacturing accuracy cannot be enhanced greatly, and accordingly, unevenness in thickness and eccentricity between the outer periphery and the inner periphery of a disc are large. Further, unbalance in weight caused by printing letters and a pattern on the disc is not negligible.

If a system having such a large unbalance is rotated, unbalance vibration would occurs due to a cause such that the center of gravity of the rotary system does not precisely align with the rotating center thereof. The force causing unbalance vibration is exhibited by the following formula (1):

$$F = m \times \epsilon \times \omega^2 \qquad (1)$$

Where $\epsilon$ is a distance between the center of gravity and the rotating center of the rotary system, m is a mass of a rotary body, and $\omega$ is a rotational speed (rotational frequency).

As understood from formula (1), the unbalance vibration is proportional to the square of the rotational speed, and accordingly, it becomes serious rapidly if the rotational speed increases. The unbalance vibration not only vibrate the pick-up system so as to hinder the read/write of signals and to cause noise, but also vibrates the system itself to which the device is attached, thereby remarkably lowering the reliability of computer system itself.

This is because of the higher speed rotation of a disc due to the higher speed data transfer. For example, in the case of an 8-X CD-ROM drive, the rotational speed is 4,200 r.p.m, and accordingly, the problem of unbalance vibration of a disc, as mentioned above, has been being materialized.

OBJECT AND SUMMARY OF THE INVENTION

One object of the present invention is to provide a highly reliable disc device which incorporates in its drive system composed of a disc and a drive system, a mechanism for automatically correcting unbalance of the rotary system so as to restrain generation of vibration at a high rotational speed in order to carry out high speed data transfer.

In order to achieve the above-mentioned object, a rotary system having a natural frequency $\omega n$ and a rotational frequency $\omega$ is set so that $\omega n$ is lower than $\omega$, that is, $\omega n < \omega$, and an unbalance correcting mechanism including a mass system which can smoothly rotate about a rotary shaft, is provided, thereby it is possible to correct unbalance of a rotary body itself through self-aligning action inherent to the rotary system during rotation.

Further, in addition to the above-mentioned unbalance correcting mechanism, an intermediate holding member which carries thereon a rotary drive system and an optical head is supported to a casing or a unit mechanism base through resilient elements (vibration proof legs). It is noted that the natural frequency of the support system composed of the intermediate member and the resilient elements is set to be higher than 30 Hz but lower than 70 Hz, and a lift value of the transmission characteristic thereof is set to be higher than 8 dB at a resonance point. Thus, the above-mentioned resilient elements are made of silicon group rubber or fluorine group rubber, and the intermediate holding member is supported by the resilient elements at three or four points around the outer periphery thereof.

Further, in the unbalance correcting system, a ring-like groove around the rotary shaft as a center, is formed in a clamper for fixing a disc, a disk holding part (turntable) for fixing a disc, the rotor side surface of a motor or the interior of the motor, and more than two spherical correcting members are inserted in this groove.

BRIEF DESCRIPTION OF THE DRAWINGS

FIG. 7A is a view showing a positional relationship among correcting members, the rotational center, the center of gravity and the like in an unbalanced condition;

FIG. 7B is a view showing a condition during balance correction;

FIG. 7C is a view showing a condition after balance correction;

DESCRIPTION OF THE PREFERRED EMBODIMENTS

Figure 1:
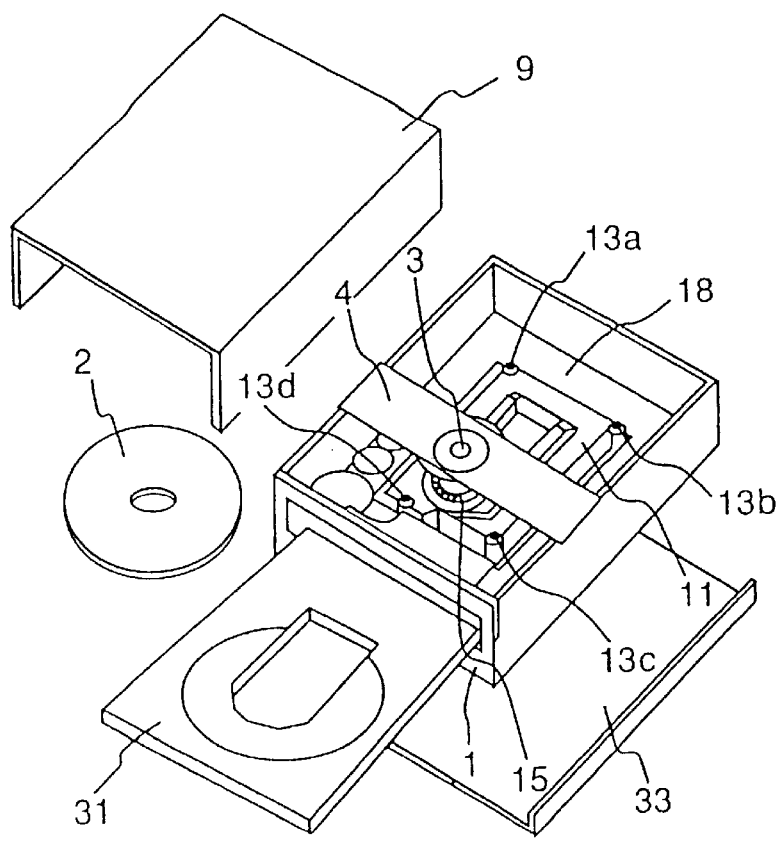
FIG. 1 is an outside view illustrating a disc device in an embodiment of the present invention.

FIG. 1 is an outside view which shows an optical disc (CD-ROM) device in which an embodiment of the present invention is incorporated. Explanation will be hereinbelow made of basic operation of the optical disc device.

At first, a disc tray 31 for loading a disc 2 into the disc device (or unloading the disc 2 from the disc device) is extended from an entrance slot formed in a front panel 1. The disc tray 31 is extended and retracted by a disc loading mechanism which is not shown. Then, the disc is set on the extended disc tray 31. Thereafter, the disc tray 31 is retracted into the disc device by means of the loading mechanism, and then, the disc 2 is shifted onto a turntable 15 as a disc carrying part provided to the shaft of a motor (spindle motor). The disc 2 carried on the turntable 15 is held between a disc clamper 3 attached to a clamper holder 4 and the turntable under magnetic attraction effected by the disc clamper 3.

It is noted that a rotary drive mechanism such as the spindle motor, an optical head for reading and writing data from and onto the disc, and a drive mechanism for the latter are provided on a unit mechanical chassis 11 serving as an intermediate holding member.

Next, the disc 2 is rotated at a predetermined rotational speed by the spindle motor 14, and data are written onto or read from the disc 2 by the optical head which is not shown, carried on the unit mechanical chassis 11 located below the disc 2. The optical head incorporates an objective lens drive mechanism and a shift means by which the optical head can be moved radially of the disc 2. The unit mechanism chassis 11 is supported on a unit mechanical holder 12 secured to a unit mechanical base 18 through the intermediary of vibration proof legs 13a, 13b, 13c formed of resilient elements. Alternatively, it is supported directly to the base of a casing (unit mechanical housing) through the intermediary of the vibration proof legs without the unit mechanical holder 12 intervening therebetween.

According to the present invention, an unbalance correcting mechanism for automatically correcting unbalance of the disc 2 is provided in the optical disc device in order to enhance the vibration-proof function of the optical disc device. Further, the natural frequency of a vibration system including the above-mentioned vibration proof legs 13 is set to a predetermined value.

The disc 2 used in a CD-ROM device or a DVD device is a removable. Since the disc 2 is mass-produced by pressing or the like, the manufacturing accuracy thereof cannot be made to be so high, that is, the unevenness of the thickness of the disc 2, and the unevenness of concentricity between the outer and inner peripheries of the disc are relative large. Unbalance of the disc 2 caused by letters and a pattern printed on the disc 2 and caused by a sorting label or the like stuck to the disc 2 by the user is not negligible. That is, the disc 2 itself is unbalanced in weight by usually 1 gcm at maximum. Thus, if such a disc 2 is rotated at a high speed, unbalanced load which is greatly increased by the rotation of the disc 2 is exerted to the spindle motor 14 for carrying the disc 2. Vibration of rotational primary component of the disc 2 caused by the unbalance load is transmitted to the unit mechanical chassis through the intermediary of the spindle motor 14, resulting in the vibration of the device itself and interference contact between the components or the like, which are caused by the transmitted vibration, and accordingly, noise is produced.

Next, the principle of the unbalance correcting mechanism will be explained, referring to FIGS. 6 and 7.

Figure 6A:
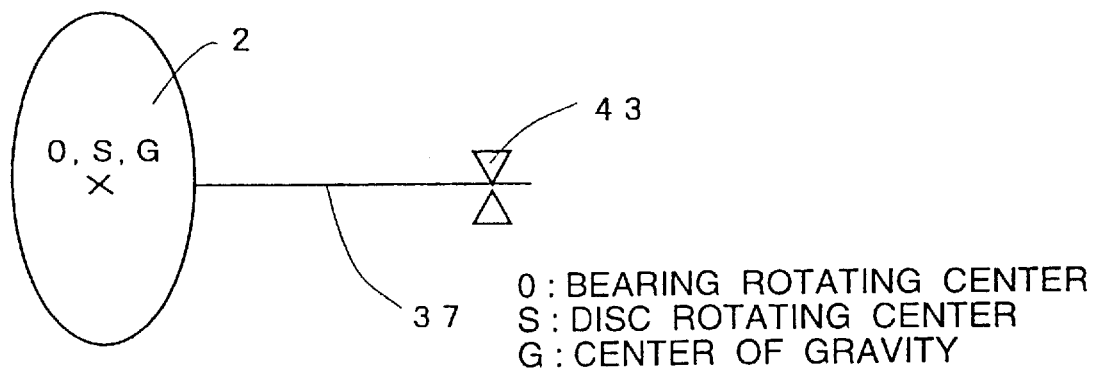
FIG. 6A is a schematic view illustrating a disc and a motor shaft in a balanced state.
Figure 6B:
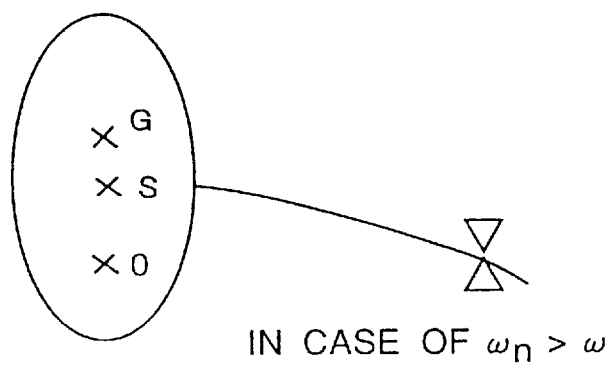
FIG. 6B is a schematic view similar to FIG. 6A, showing an unbalanced condition in which the natural frequency ωn is higher that the rotational frequency ω.
Figure 6C:
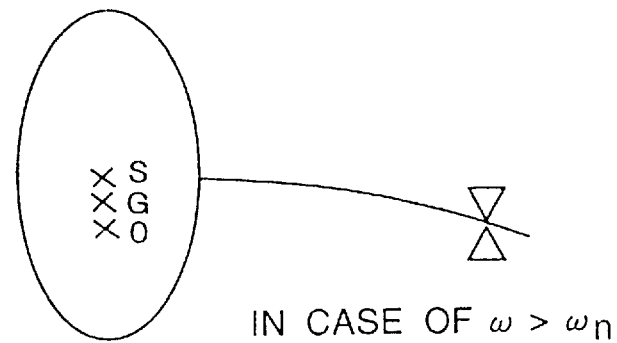
FIG. 6C is a schematic view similar to FIG. 6A, showing an unbalanced condition in which the natural frequency ωn of the rotary system is lower than the rotational frequency ω thereof.

FIGS. 6A to 6C are schematic views which show a motor and a disc attached to the motor, in which reference numeral O denotes the rotational center of a bearing, S denotes the rotational center of the disc at the surface thereof, and G denotes the center of gravity of the disc. In an ideal rotary body with no unbalance, O, S and G are completely coincident with one another as shown in FIG. 6A, but in an unbalanced rotary body, the shaft is drawn outward by the centrifugal force of the unbalance, causing deflection or deformation of the shaft.

The phases of the points S, G, relative to the point O, vary, depending upon the relationship between the natural frequency ωn and the rotational frequency ω of the rotary system. This condition is shown in FIGS. 6B and 6C. If ωn is greater than ω (FIG. 6B), the point G is positioned outside of the point S. If ωn is equal to ω (critical), the points S, G are positioned on one and the same straight line. If ω is greater than ωn (FIG. 6C, overcritical), this relationship is reversed so that the point S is positioned outside of the point G. In order to correct the unbalancing, this overcritical condition is used.

FIG. 7 is a schematic view which shows the relationship among unbalance correcting members 7a, 7b (spherical bodies) provided in the rotary body, and the rotational center, the center of gravity and the like.

Two correcting members 7a, are provided so as to smoothly rotationally move in such a way that their centers move depict a locus S. It is estimated that the correcting members 7a, are secured in a condition as shown in FIG. 7A, until the overcritical condition occurs. The rotational speed increases to a constant rotational speed in the overcritical condition. In this condition, the positions of centrifugal forces F1, F2 exerted to the correcting members 7a, 7b and the points O, S, G are shown in FIG. 7A in which the center G of gravity is that of the entire rotary system including the correcting members 7a, 7b. In this condition, if the fixing of the correcting members 7a, 7b is released, the correcting members 7a, 7b are shifted from the condition shown in FIG. 7A into a condition shown in FIG. 7B by the circumferential components of the centrifugal forces F1, F2. The shifting of the correcting members 7a, 7b causes the center G of gravity to be shifted in an upward direction as viewed in the figure, that is, the direction toward S, and accordingly, the difference between the points S, G which approach each other becomes less. That is, the points S, G, O are coincident with one another in a direction in which the unbalancing is decreased due to the shifting of the correcting members 7a, 7b. That is, it continues until a condition in which the unbalancing is completely eliminated, occurs. Thus, the unbalance of the rotary system which exists in the initial stage can be automatically corrected by the correcting members 7a, 7b.

Due to the provision of the above-mentioned automatic unbalance correcting mechanism for the rotary body, a disc 2 having a large unbalance can be rotated at a high speed without generation of vibration, thereby it is possible to transmit data at a high speed with no deterioration of reliability.

Figure 2:
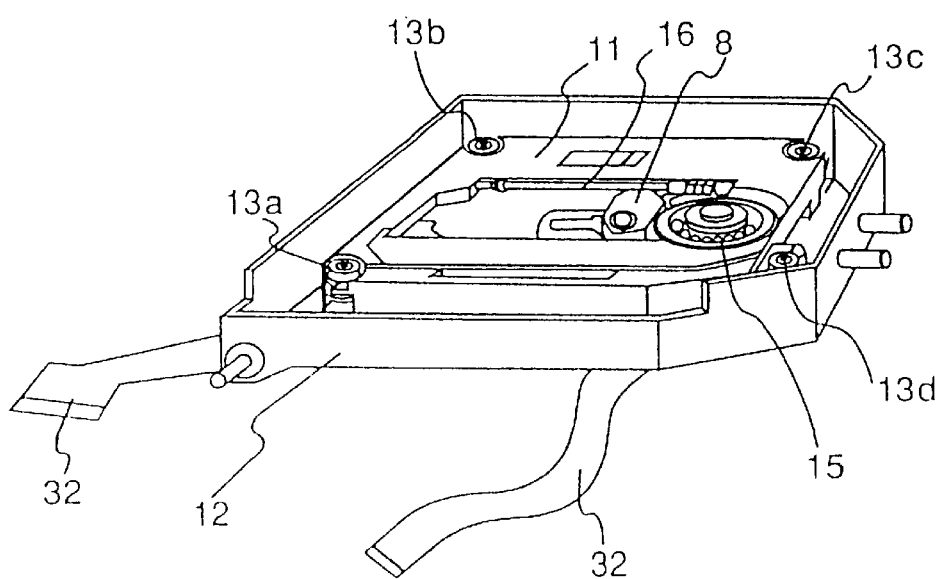
FIG. 2 is an outside view illustrating a unit mechanical part shown in FIG. 1.

FIG. 2 shows the external appearance of the unit mechanical part of the disc device (FIG. 1) incorporating the above-mentioned unbalance correcting mechanism.

In this embodiment, the unbalance correcting mechanism has a such an arrangement that a plurality of correcting members (balance balls) 7a, 7b are provided in a groove 17 formed in the disc carrying part (turn table) of the spindle motor 14. The optical head 8 incorporating the objective lens can be moved radially of the disc along a guide rail 16. The unit mechanical chassis 11 having a substantially rectangular shape in ths embodiment is attached to the unit mechanical holder 12 by means of the vibration proof legs 13a. 13b, 13c and 13d.

Next, a specific embodiment of the automatic balance correcting mechanism will be explained.

Figure 3:
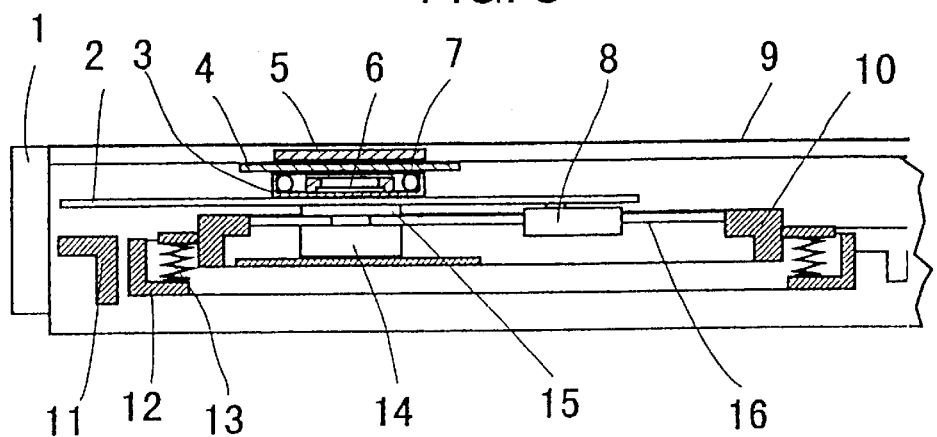
FIG. 3 is a sectional view illustrating the disc device in which an unbalance correcting mechanism is provided in a clamper.

FIG. 3 is a sectional view which shows a CD-ROM device provided with the unbalance correcting mechanism on the disc clamper 3 side.

The disc 2 as a recording medium, is inserted into the device from the front panel 1 side by means of a tray of a loading device. At this time, a unit mechanical system composed of the spindle motor 14, the pick-up 9 and the drive system therefor, is retracted in order to hinder the loading of the disc 2. When the disc 2 is completely inserted into the device, the unit mechanical system initiates its movement, and when the height of the turntable 15 attached to the spindle motor 14 becomes equal to the height of the disc 2, it stops the movement. Simultaneously, the disc 2 is clamped by attracting forces of a magnet 27 on the turntable 15 and a magnetic member 6 provided to the clamper 3, and is secured by the clamp holder 4 and the clamp retainer 5. Thus, the disc 2 can be rotated by the spindle motor 14, and simultaneously, optical data on the disc 2 can be read by the optical head 8 attached to the unit mechanical system. It is noted that the unit mechanical system is incorporated in a unit mechanical housing 10, and is covered with a top cover 9.

The unit mechanical base 18 is supported to the unit mechanical chassis 11 by means of vibration proof legs 13 made of soft rubber or formed of springs. The purpose of the provision of the vibration proof legs 13 is to prevent unbalancing oscillation of the disc 2 from being transmitted outside of the device, to prevent vibration outside of the device from being transmitted to the unit mechanical base 18, and to effectively operate the unbalance correcting mechanism.

Figure 5:
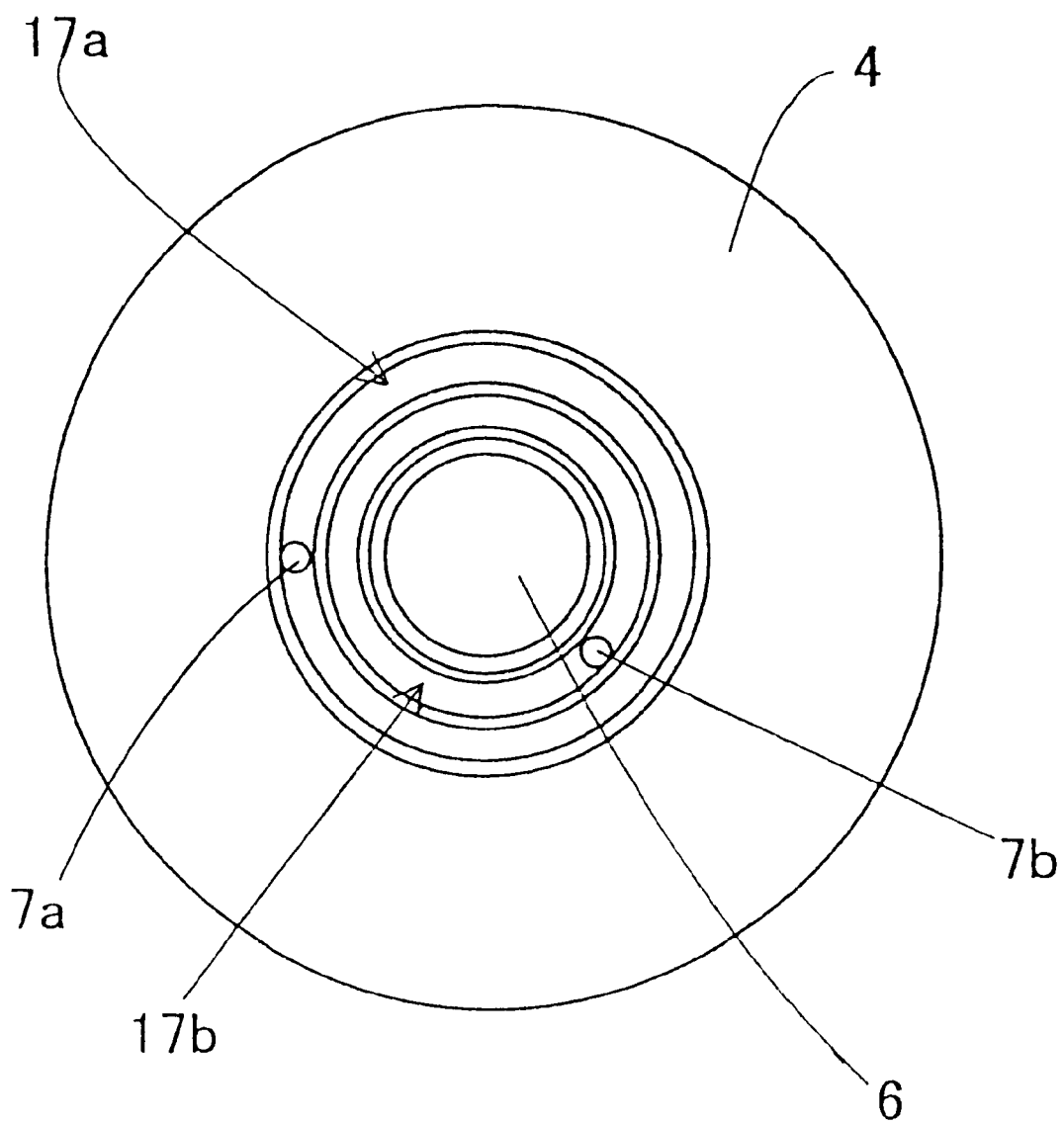
FIG. 5 is a view illustrating unbalance correcting members and a rolling groove in an embodiment of the present invention.

FIG. 5 shows an example of the unbalance correcting mechanism. In this example, two rolling grooves 17a, 17b are formed, each incorporating therein with a correcting member 1. However, it is natural that a single groove can incorporate two correcting members. The explanation will be hereinbelow made with such an estimation that the single groove is used.

The first essential feature of the present invention is the provision of an unbalance correcting mechanism integrally with the above-mentioned clamper 3. This unbalance correcting mechanism is composed of a ball guide having an arcuate rolling groove 17, and two correcting members (balance balls) 7a, 7b used in the groove 17.

The rolling groove 17 which is formed in the ball guide, extending circumferentially of the latter, has a width which is slightly larger than the diameter of the correcting members 7a, 7b, and is inserted therein with the two correcting members 7a, 7b. The side surfaces and the bottom surface of the rolling groove 17, and as well the outer surface of the correcting members 7a, 7b are finished so as to be smooth in order to allow the correcting members 7a, 7b to freely move in the rolling groove 17.

The material of the correcting members 7 should be selected so that it is nonmagnetic, and has a high density, and it can hardly cause occurrence of aging effect such as occurrence of abrasion or corrosion at the outer surfaces of the correcting members. If it is magnetic, it is magnetized by a clamping magnet 27 provided in the clamper 3 so as to cause such a problem that the two correcting members 7a, 7b are attracted. If it has a low density, the degree of unbalance correction becomes small. The aging effect of the outer surface increases the frictional force which hinders the movement of the correcting members 7a, 7b. In view of these problems, the correcting members are suitably made of nonmagnetic stainless steel or glass.

The maximum degree of unbalance which can be corrected is exhibited by the following formula in such a condition that the two balls assemble together in an unit body:

$$W = 2 \times mb \times r$$

Where mb is a weight of each of the correcting members 7a, 7b, r is the rolling radius of the same. The maximum degree w of unbalance of the disc 2 can be considered by experience to be 1 gr.cm at maximum. If the rolling radius is r=1.75 cm which is substantially equal to the outer diameter of the clamper 3, a required weight md of each of the correcting members 7 can be determined from the following formula;

$$mb = w/(2 \times r) = 1/(2 \times 1.75) = 0.28 \text{ gr}$$

The weight of a stainless balls having a diameter of 4 mm is 0.27 gr, and accordingly, the this ball can be used to cope with the above-mentioned maximum of unbalance of the disc 2.

The second essential feature of this embodiment is the provision of such an arrangement that the natural frequency ωn which is exhibited by the following formula;

$$\omega n = \sqrt{(m/K)}$$

where K is a rigidity of the above-mentioned vibration proof legs 13 and M is a mass of the above-mentioned unit mechanical base 18, is set to be smaller than the rated rotational speed ω of the device, and the device is operated in an overcritical condition. Operation is made with the unbalance correcting mechanism having a configuration as mentioned above, and through the overcritical condition, the correcting members 7 are shifted in a direction reverse to that of the unbalance of the disc 2 since the phases of the center of gravity and the rotational center are reversed, and accordingly, the unbalance can be automatically corrected.

In the case of a CD-ROM device, the rotational speed of the spindle motor 14 is controlled so that the peripheral speed is constant. That is, when the pick-up 8 is located at the inner peripheral side, the rotational speed is high, but when it is located at the outer peripheral side, the rotational speed is low. The rotational speed at which an audio CD is reproduced, is called as a standard speed which is in a range between 3.8 Hz at its outer periphery and 8.3 Hz at its inner periphery. Due to the demand of increasing the speed of data transmission speed, these days, the rotational speed of the CD-ROM device is planed to be 12 times as high as the standard speed (that is, 45 Hz at the outer periphery and 100 Hz at the inner periphery). The natural frequency ωn is set to be higher than the rotational frequency of the standard speed at the inner periphery but is lower than the rotational frequency of the used speed at the outer periphery. If the natural frequency ωn is set to a value lower than the standard rotational speed, the rigidity of the vibration proof legs 13 has to be extremely small, and accordingly, the vibration proof legs 13 would be greatly deformed when an external force is exerted thereto. Thus, it is anticipated that the disc 2 or the like cannot be stably supported, and accordingly, it is not practical. On the other hand, a rotational speed ω substantially equal to the standard speed does not cause a problem even though the unbalance vibration is not corrected since the unbalance vibration is small.

Attention has to be taken for the damping rate of the vibration when the natural frequency ωn is set. In view of the vibration-proof, it is effective to use a material having a large damping rate in order to decrease the amplification factor of vibration peak. However, in this embodiment, the vibration proof legs 13 made of such a material having a high damping rate causes a problem. Since the material having a high damping rate delays the reversing of the phase. As mentioned above, since the reversing of the phases of the rotational center and the center of gravity during overcritical operation is used in the unbalance correcting mechanism according to the present invention, the phases cannot be completely reversed if a the material having a high damping rate is used, and accordingly, the effect of the correction is low. In the case of a damping rate which is 25%, even though ωn is set to one-third (⅓) of ω, the phase does not shift, exceeding an angle of 160 deg. in this condition, the effect of correction for unbalance is low. In this embodiment, the damping rate is set to 5% while ωn is set to ½ of ω, the reversing of the phases of about an angle of about 180 deg. can be obtained, thereby sufficient unbalance correction can be expected.

Figure 4A:
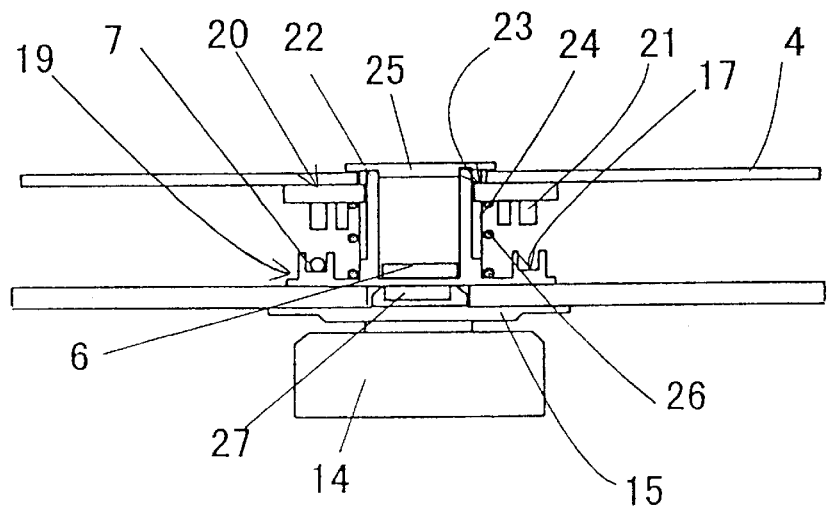
FIGS. 4A and 4B are detailed sectional views illustrating the unbalance correcting mechanism.
Figure 4B:
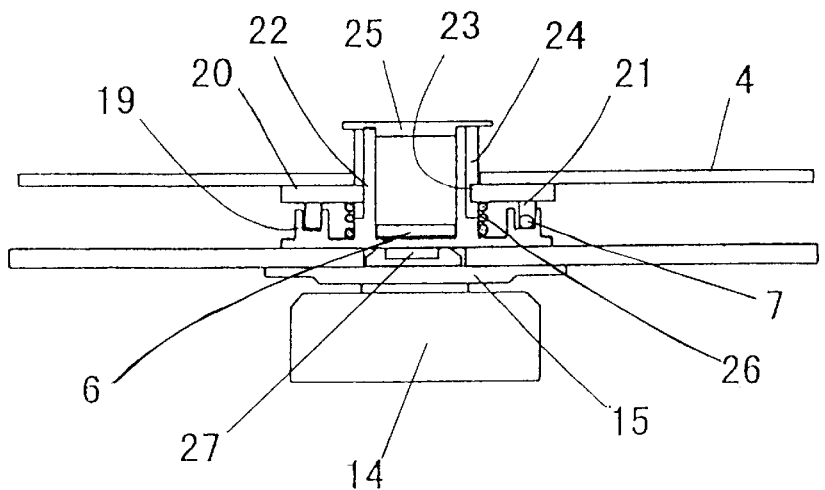

FIG. 4 is an embodiment in which the unbalance correcting mechanism is provided in the disc clamp 3 part.

The essential feature of this embodiment is the provision of a first clamp 19 on which the unbalance correcting mechanism composed of the correcting members 7 is provided, and a second clamp 20 incorporating a ball fixing mechanism which can be vertically moved, coaxial with the first clamp 19 is provided. In the case of a CD-ROM device, since the rotation of the disc 2 is made in such a condition that the peripheral speed is constant, the spindle motor 14 is accelerated and decelerated in accordance with a position of the pick-up 8 in order to change the rotational speed. In the case of no fixing mechanism for the correcting members 7, since the correcting members 7 would turn at a constant rotational speed upon such acceleration and deceleration, relative rotation occurs between the correcting members 7 and the disc 2. With a design such that full attention is made to the ranges of both natural frequency ωn and rotational speed ω, the correcting members 7 can be finally stabilized to their original correcting positions even thought the rotational speed ω varies. However, since the frictional force between the rolling surface of the rolling groove 17 and the correcting members 7 is set to be low in order to reduce the affection of the friction exerted to the correcting members 7, a time is required more or less until the correcting members are stabilized. If the period from the time when the rolling of the correcting members 7 is initiated due to acceleration and deceleration to the time when it is stabilized, exceeds a seek time by which the pick-up 8 moves, data has to be read in an unstable vibration condition, causing deterioration of the reliability of the device itself. Thus, the fixing mechanism for the correcting members 7 are provided so that the correction is once made, and in this condition, the correcting members 7 are fixed in this condition, thereby it is possible to solve the above-mentioned problems.

The second clamp 20 is assembled in such a way that a protrusion 23 of the second clamp 20 is snugly fitted in a hollow shaft 22 of the first clamp 19, which extends from the first clamp 19, which is hollow and which is formed on its outside with a first clamp groove 24 so that the second clamp 20 can be rotated simultaneously with the rotation of the first clamp 19 while it can be vertically moved. Further, a spring 26 is provided between the first clamp 19 and the second clamp 20 so that the first clamp 19 and the second clamp 20 are held to be opened if no vertical force is exerted thereto. The second clamp 20 is formed therein with several teeth 21 having a width which is narrower than the rolling groove 17, at a position just facing the rolling groove 17 for the correcting members 7, formed in the first camp 19, the several teeth 21 being adapted to enter the ball rolling groove 17 of the first clamp 19 over the entire periphery thereof when the second clamp 20 lowers. The pitches of these teeth 21 is slightly larger than the diameter of the correcting member 7, but are equally divided circumferentially. The height of the teeth 21 is set so that the gap between the bottoms of the rolling members 17 and the tip ends of the teeth 21 becomes smaller than the diameter of the correcting members 17 in such a condition that the first clamp 19 and the second clamp 20 are closed.

In such a condition that the first clamp 19 and the second clamp 20 are opened, the correcting members 7 can freely be moved in the rolling groove 17, but when they are closed, the correcting members 7 are clamped between the teeth 21 of the second clamp 20 so that they cannot be moved. In such a condition that the first clamp 19 and the second clamp 20 are opened, unbalance correction is carried out under overcritical condition, and after the correcting members 7 become stable, when the first and second clamps 19, 20 are closed, the corrected condition of the correcting members 7 can be held. The opening and closing of the first and second clamps 19, 20 are carried out through the vertical motion of the unit mechanical base 18 upon ejection of the disc 2. In a conventional device, upon insertion of the disc 2, the unit mechanical base 18 is retracted downward in order to prevent the spindle 14 from hindering the disc 2, and after the completion of insertion of the disc 2, the unit mechanical base 18 is raised up to an operating height so as to clamp the disc 2 with the use of the attracting forces of the magnet 27 provided in the spindle motor 14 and the magnetic member 6 provided to the clamper. This operation is carried out by gear and cam mechanisms and a motor provided in the chassis 11 and the unit mechanical base 18. However, the essential feature of this embodiment in which the unit mechanical base 18 is raised upward from the retracted condition, and the first clamp 19 is attracted by the magnet 29 of the spindle motor 14 so as to secure the disc 2 which can be therefore rotated, is the provision of such an arrangement that there are established a condition in which the first clamp 19 and the second clamp 20 are opened so that the correcting members 7 can be moved freely (which will be hereinbelow mentioned as correcting mode"), and a condition in which the unit mechanical base 18 is further moved so as to close the first clamp 19 and the second clamp 20 in order to secure the correcting members 7 (which will be mentioned as rated mode", FIG. 5B).

Explanation will be hereinbelow made of the operation. When the disc 2 is inserted, the unit mechanical base 18 takes the lowest position. As the disc 2 is inserted, the unit mechanical base 18 is moved upward, and comes to a stop once in the correcting mode. In this condition, the first clamp 19 is operated so as to clamp the disc 2. In this phase, the first clamp 19 and the second clamp 20 are held to be opened, as shown in FIG. 4a, and accordingly, the correcting members 7 can freely move in the rolling groove 17. The positional relationship between the pick-up 8 and the disc 2 has been established. After starting of the rotation of the disc 2 by the spindle motor 14, the disc 2 is rotated at a constant rotational speed in an overcritical condition, exceeding the natural frequency ωn of the rotary system. This rotational speed is determined in consideration with the damping characteristic of the above-mentioned vibration proof legs 13, but can be determined, irrespective of the rated rotational speed of the device itself. At the time when the correcting members 7 become stable at their correcting positions, the unit mechanical base 18 is further moved upward while the rotational speed being held, and comes to a stop in the rated mode. The first clamp 19 and the second clamp 20 are gradually closed through the movement of the unit mechanism 18, and accordingly, the correcting members 7 are secured by the teeth 21 formed in the second clamp 20 in the rated mode, at the correcting positions. By securing the correcting members 7 at the positions where the balance correction is made, the correcting members 7 are not moved even though the rotational speed is changed in association with a position of the pick-up 8 in order to make the line speed constant, and accordingly, it is possible to prevent deterioration of the seek performance.

In this embodiment, with the use of a vibration sensor such as an acceleration sensor, the manipulatability can be improved. For example, a vibration sensor is attached to the unit mechanical base 18. Explanation will be made of the operation of this embodiment in the case of the provision of the vibration sensor. When the disc 2 is inserted, the unit mechanical base 18 is moved to a rated position, and the correcting members 7 are secured at arbitrary positions. Thereafter, the rotation of the motor is started. In this condition, the measurement of vibration is carried out. If it is determined that the level of vibration is low, the data are read soon, but it is determined that the level of vibration is high, the unit mechanical base 18 is lowered down to the correcting mode position. Thereafter, the unbalance correction is carried outer in a procedure similar to that made in the case of no provision of the vibration sensor. In the case of the presence of the vibration sensor, no unbalance correction is required for every disc 2, and accordingly, it is possible to promote the operation steps from the insertion of the disc 2 to the stating of the reading of data.

Next, explanation will be hereinbelow made of the arrangement in which two rolling grooves 17a, 17b are formed, and the correcting members 7a, 7b are incorporated in these grooves, respectively.

Should a plurality of correcting members 7 are incorporated in a single groove 17, the correcting members 7 impinge upon each other during unbalance correction, and cause occurrence of an unstable phenomenon. Further, in the case of using magnetic correcting members 7, since it is magnetized, the correcting members 7 are attracted to each other. Thus, in this embodiment, the plurality of rolling grooves 17 are formed, and the correcting members 7 are incorporated in these rolling grooves 17, respectively. Thereby it is possible to enhance the reliability of the balance correction.

Figure 8:
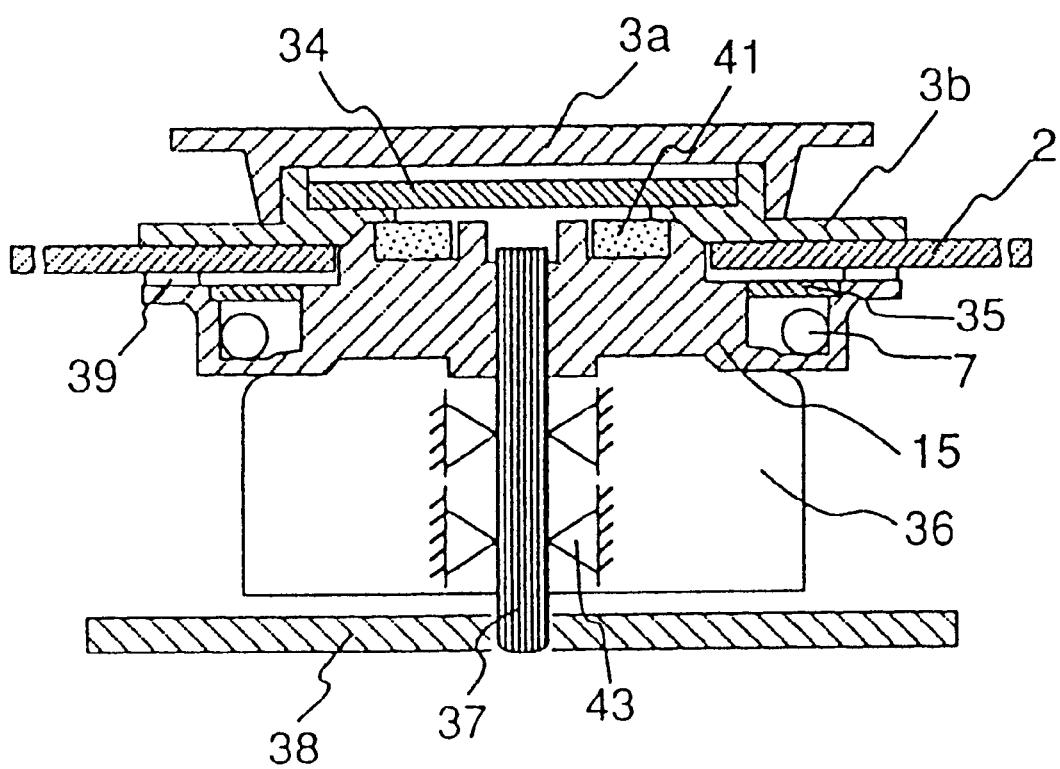
FIG. 8 is a sectional view illustrating the unbalance correcting mechanism incorporated in a turntable in an embodiment of the present invention.

Next, explanation will be made of an arrangement in which the unbalance correcting mechanism is provided to the turntable of the spindle motor 14 with reference to FIG. 8.

A disc rotating system for an optical disc, is composed of a spindle motor 14, a disc 2 serving as a recording medium, a disc clamper 3 for securing the disc 2 onto the turntable 15, a rubber element 39 for preventing the disc from slipping, and the like. The spindle motor is composed of the turntable 15 for carrying the disc 2, a shaft 37 press-fitted in the turntable 15, and a rotor 36 press-fitted onto the shaft 37. A magnetic circuit for generating a rotary drive power for the spindle motor 14 is formed in the rotor 36, and the rotor 36 serving as a rotary part is attached thereto with a cylindrical magnet multi-polarized. In the rotor 36, a core serving as a stationary part, and a coil are attached to a stator substrate 38.

The shaft 37 is rotatably supported to the stationary side by means of a bearing 43 such as a ball bearing or a slide bearing. Further, the stationary part is secured onto the stator substrate 38 to which a spindle motor control substrate is applied. Detailed explanation will be made of the turntable 15 incorporating the unbalance correcting mechanism as shown in the figure.

The turntable 15 is formed therein with a ring-like groove 17 in which a disc securing magnet 41 is provided. A disc 2 carried on the turntable 15 is clamped by the disc clamper 3 from above so that the disc 2 is secured. This is caused by the magnetic attracting force applied by an attracting iron plate 34 in the disc clamper 3, facing the disc securing magnet 41. A ring-like groove 17 (rolling groove) is also formed in the turntable 15 outside of the former ring-like groove 17, and is incorporated therein with correcting members (balance balls) 7 for correcting unbalance. The groove 17 in which the correcting members 7 are incorporated, is completely covered with a dust protecting cover 35 for preventing dust from entering therein from the outside.

As mentioned above, unbalance vibration caused by unbalance of the disc 2 is exerted radially of the disc due to deflection and rotation of the shaft. If the unbalance correcting mechanism is incorporated in the turntable 15, the above-mentioned correcting members 7 also centrifugally act upon the rotary shaft. These two forces can be effected substantially in the same plane so as to correct unbalance without exerting an angular moment to the shaft 3. Further, the ring-like groove 17 formed in the turntable 15 is completely fixed to the shaft 37 as a rotary shaft, and accordingly, it can be easily formed, concentric with the rotary shaft, thereby it is possible to reduce the rotational eccentricity of the ring-like groove 17.

Next, explanation will be made of the operation of the correcting members 7 with reference to FIG. 10.

Figure 10:
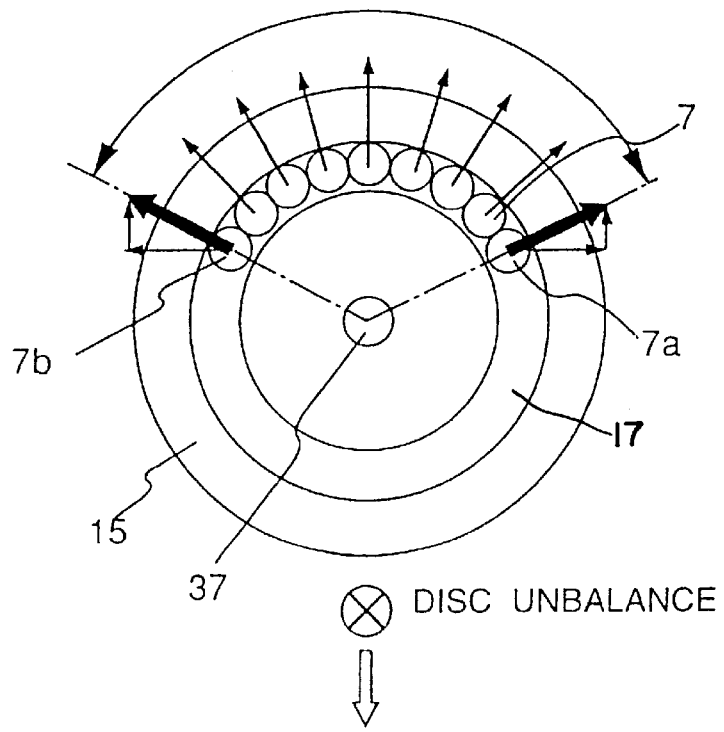
FIG. 10 is a view showing an arrangement of the correcting members in the unbalance correcting mechanism.

FIG. 10 shows the configuration of the correcting members 7 set in the ring-like groove 17 formed in the turntable 15.

The correcting members 7 are used by at least two in the unbalance correcting mechanism in the present invention. Further, each of the correcting members 7 is formed of a nonmagnetic true-circular rigid ball in order to prevent affection by a magnetic field. For example, in the case of the presence of disc unbalance in the lower part of the figure, a force caused by this disc unbalance is effected in a centrifugal direction (indicated by the arrow). On the contrary, in an ideal corrected condition, the correcting members 7 are located in the direction opposite to the direction of the disc unbalance. The unbalance correcting force at this time is effected in the direction of a component of a centrifugal force exerted to the correcting members 7, opposite to the direction of the unbalance. In the case of the presence of a plurality of the correcting members 7, the sum of the components of centrifugal forces exerted to the correcting members 7 gives an unbalance correcting force. Accordingly, the correcting members 7 located in the ring-like groove 17 make contact with the pathway surface to which they cling under a centrifugal force while they are arranged, adjacent to one another, and in this condition, the positions of correcting members 7a, 7b at opposite ends of them, are located in directions which are directed from the rotational center, right angles to the disc unbalance so that the components of the centrifugal force becomes zero. That is, in the case of the arrangement of the plurality of correcting members in the correcting direction, the shape and the number of the correcting members should be determined in such a way that the correcting members at the opposite ends are set within an angular range of less than 180 deg. In this embodiment, estimating that the degree of unbalance is 1 gr.cm in the worst case in view of a degree of a disc unbalance in a CD-ROM device in general, stainless rigid balls having a diameter of about 2 to 3 mm are used by a number of 8 to 15 as the correcting members 7 which can be set in a groove 17 having a shape that can be formed in the turntable 15 for a spindle motor available at present (the outer diameter of the balance ball pathway is about 25 mm). The effect of correction by these correcting members is 0.5 to 0.8 gr.cm, and accordingly, even in the case of the disc unbalance of 1 gr.cm, vibration can be restrained below a degree corresponding to an unbalance load of 0.5 to 0.2 gr.cm. Further, by making the correcting members from a material having a heavy density and by using a correcting pathway having a large diameter, the correcting force can be further increased. Although the explanation has been made such that spherical bodies such as the balance balls are used as the correcting members 7 for correction of unbalance, it goes without saying that not only the spherical bodies but also those which can move through the correcting grooves 17 with a small frictional force, or fluid may be also used.

Further, in such a case that the frequency of replacement of discs is less, the correcting members may be secured after correction of unbalance, similar to the arrangement in which the unbalance correcting mechanism is incorporated in the clamp part, as mentioned above.

In the device in this embodiment, the unit mechanical chassis 11 shown in FIG. 2, is supported to the unit mechanical holder 12 by means of four vibration proof legs 13a, 13b, 13c, 13d. The correcting members 7 is shifted toward the disc unbalance side in a range of $\omega n > \omega$ where $\omega n$ is the natural frequency of this support system, and $\omega$ the rotational frequency of the spindle motor at a start of rotation, that is, before the rotational frequency exceeds the natural frequency. The support system is a primary vibration system, and accordingly, the phase is inverted by an angle of 180 deg. when it exceeds an eigenvalue. Thus, if the rotational frequency $\omega$ exceeds the natural frequency $\omega n$, a force in a direction opposite to the direction of unbalance acts upon the correcting members 7. Accordingly, when the spindle motor is rotated at a rotational speed in a range of $\omega n < \omega$, the correcting members are 7 shifted in a direction of correction of unbalance. For the unbalance correction in this embodiment using this principle, the setting of a natural frequency $\omega n$ of the support system, in particular, the vibration proof legs 13, the way of the direction of the shift of the phase in a frequency range exceeding the natural frequency $\omega n$, and so forth are important.

Figure 9:
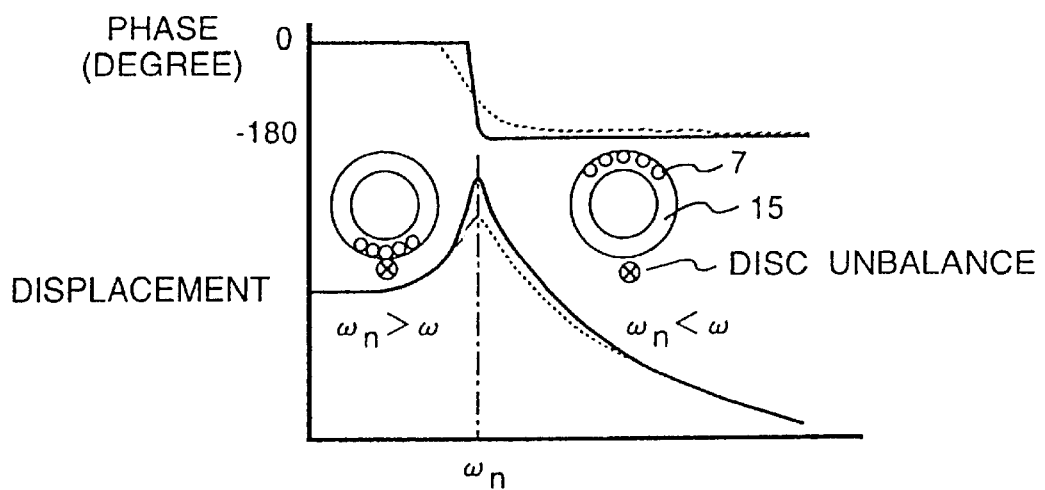
FIG. 9 is a view showing displacement response and phase relationship of a support system.

FIG. 9 shows a vibration transmitting characteristic of the vibration proof leg 13 as mentioned above. The correcting members 7 located in the ring-like groove 17 shown in FIG. 8, act in the direction of unbalance as shown in a range in which the rotational frequency $\omega$ of the spindle motor is less than the natural frequency $\omega n$ exhibited by the vibration proof legs 13, due to a centrifugal force given by a disc unbalance. If it exceeds the natural frequency $\omega n$, the phase is inverted, exceeding an angle of 180 deg, the above-mentioned centrifugal force acts in a direction opposite to the direction of unbalance so that the correcting members 7 act in the direction of correction of unbalance.

Next, explanation will be made of the setting of the natural frequency. As mentioned as to the action of the unbalance correcting mechanism, the natural frequency $\omega n$ of the support system should be set to be lower than the rotational frequency $\omega n$ of a disc. An objective lens actuator used in a CD-ROM device, a DVD device or the like, has two axial freedoms in order to allow its objective lens to follow a surface deflection (surface oscillation) or eccentric motion of the disc. Specifically, it is in general supported by a suspension having freedoms in the above-mentioned directions.

The natural frequency $\omega n$ of the suspension system is set to about 30 Hz for determining a d.c. sensibility of the actuator in order to follow rotational primary components of surface deflection of $\pm 500 \mu m$ and an eccentricity of $\pm 70 \mu m$. Further, in order to carry out the correction of unbalance at the rotational speed higher than that of a 8x CD-ROM device which has remarkably exhibited unbalance frequency these days, the rotational speed of 8x is set to be lower than 70 Hz.

Next, explanation will be made of the damping characteristic of the support system. In the case of making the vibration proof legs 13 of a material having a high degree of damping, the phase rotation is slow in a condition in which the rotational frequency exceeds the natural frequency $\omega n$ of the support system, due to the damping effect, and accordingly, a characteristic indicted by the chain line is exhibited. That is, the correcting members 7 are unstable around ideal positions by a degree corresponding to that the phase cannot be shifted toward the unbalance direction, that is, a sufficient effect of correction cannot be obtained. Accordingly, in the correction of unbalance using the correcting members 7, the support by resilient members having a damping which is less than that of conventional support legs is preferable. With the resilient member having a small damping, when the rotational frequency exceeds the natural frequency ωn, the phase shift is fast in comparison with vibration proof legs 13 having a large damping, and accordingly, the correcting members 7 are shifted to positions which are substantially ideal.

Accordingly, the explanation will be made of the characteristics of the vibration proof legs 13 which are required for the correction of unbalance according to the present invention, with reference to FIG. 11, as to a vibration ratio (rotational frequency ω/natural frequency ωn), an amplitude amplification factor and a phase characteristic.

For example, estimation is made such that the natural frequency of the support system given by the vibration proof legs 13, is 30 Hz, and the disc rotational speed of 5,500 revolution per minute (about 90 Hz) corresponding to that of a 10x CD-ROM. The vibration ratio should be three times, 90/30=3, and the damping ratio $\zeta$ should be less than 0.2 in view of a phase shift of an angle larger than 170 deg. The amplitude amplifcation factor is about 2.5 when the damping ratio $\zeta$ is 0.2. Accordingly, in the above-mentioned-condition, the degree of lift-up of the characteristic at the resonant point of the vibration proof legs 13 should be set to be greater than 2.5 times (8 dB).

Figure 12:
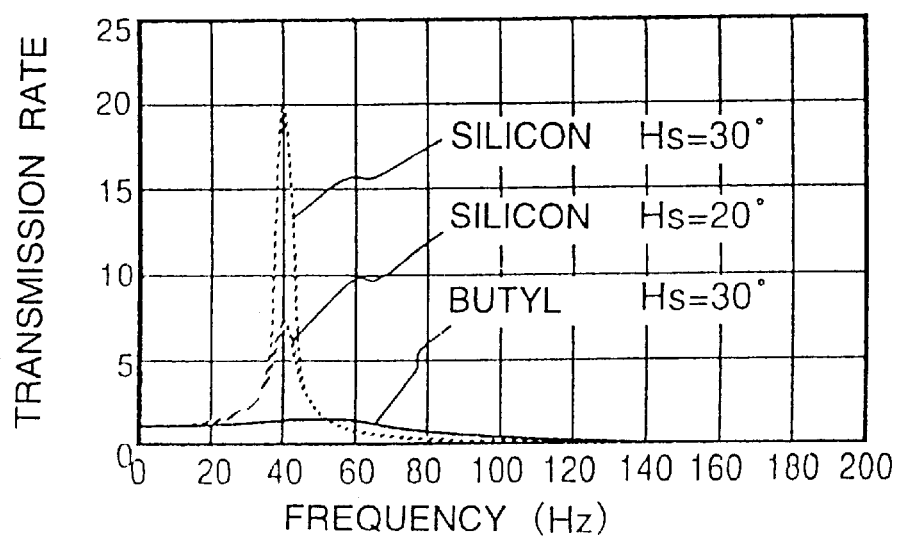
FIG. 12 is a view showing transmission characteristics of the resilient elements, which are different from one another due to natures of materials.

FIG. 12 shows transmission ratios of materials of the resilient members used for the specific vibration proof legs at a resonant point. In general, butyl group rubber is used as the material of the resilient members for the vibration proof legs 13 in a CD-ROM drive or a DVD drive. As mentioned above, this is because of using the vibration legs having a high damping rate for preventing exciting force from being transmitted from the exterior to the interior. As to the vibration proof legs 13 made of butyl group rubber having a rubber hardness of 30 degrees, and incorporated in, for example, an actual device, the amplitude amplification factor (transmission rate) is about 2 times at the resonant point as indicated by the solid line in the figure. In this case, estimating that the damping ratio $\zeta$ is about 0.25 and the vibration ratio is 3 times, the phase is not shifted, exceeding an angle of about 160 deg. and accordingly, ideal correction of balance cannot be made by the correcting members 7.

Figure 11:
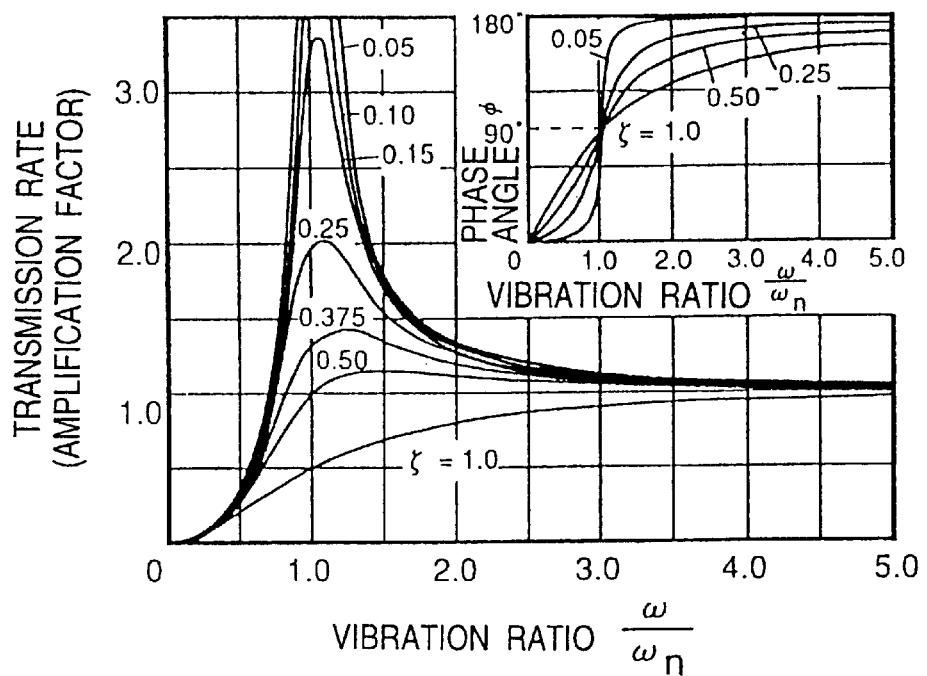
FIG. 11 is a view showing a relationship between the frequency, the amplitude ratio and the like of vibration of a viscous damping system.

On the contrary, in the case of using silicon group rubber having a hardness of about 20 degrees, the amplitude amplification factor is about 7 times (when damping rate is obtained in the bandwise direction from the characteristics shown in FIG. 11, it becomes $\zeta$=0.06). Further, in the case of using silicon group rubber having a hardness of 30 degrees, the amplification factor is about 20 times (when the damping rate is obtained from the characteristics shown in FIG. 11, it becomes $\zeta$=0.03) as indicated by the one-dot chain line. As mentioned above, with the use of the vibration proof legs 13 made of silicon group rubber, the damping rate $\zeta$ can be easily reduced from 0.06 to 0.03, and accordingly, if the vibration proof legs 13 made of silicon group rubber is used, the phase is shifted by an angle of about 180 deg. under the same condition as mentioned above, the correcting members 7 are shifted to ideal correcting positions. With the vibration proof legs 13 having a usual shape, butyl group rubber can hardly increase the amplitude amplification factor up to about 2.5 times at a resonant point, and accordingly, it is found that silicon group rubber is preferable. Further, the silicon group rubber is excellent in its temperature characteristic, and accordingly, it is possible to provide a disc device having a high degree of reliability. It is noted that, in addition to the silicon group rubber, fluoro rubber having a small damping rate may be used in order to obtain similar effects.

Figure 13:
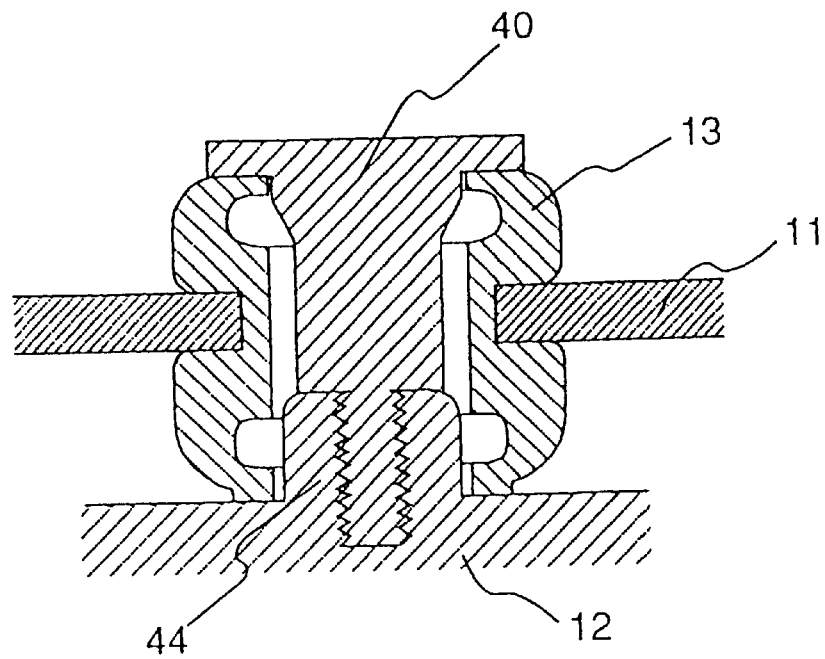
FIG. 13 is a sectional view illustrating a vibration proof leg in an embodiment of the present invention.

FIG. 13 shows a sectional shape of the vibration proof legs in an embodiment. The vibration proof legs 13 has a structure in which a shoulder is formed in the center part thereof. Thus, the shoulder of the vibration proof leg 13 is supported by the unit mechanical chassis 11, and then the vibration proof leg 13 is fastened onto a boss part 44 provided on the unit mechanical holder 12 by a retaining screw 40. A gap is defined between the retaining screw 40 and the inner surface side of the vibration proof leg 13. With this arrangement, the unit mechanical chassis 11 and the unit mechanical holder 12 are resiliently supported by the vibration proof leg 13. By using silicon group rubber or fluoro rubber as a material of the vibration proof leg 13, the unbalance correcting mechanism as mentioned above, is operated so as to effect the correction of unbalance with a high degree of accuracy.

As mentioned above, with the use of the arrangement in which the unbalance correcting mechanism is incorporated in the turntable 15, the correction of unbalance can be made without great improvement in the drive mechanism. Further, since the groove 17 is formed in the turntable 15, the grooving process can be carried out so as to easily form a true-circular groove 17 with no eccentricity with respect to the rotational center. Since nonmagnetic rigid balls are used for the correcting members 7, the degree of correction is given by the sum of mass systems of the correcting members 7, thus it is possible to obtain a large degree of correction. Further, since the correcting members 7 are nonmagnetic, the correcting members 7 can be prevented from being magnetically attracted, and accordingly, the reliability of rolling thereof is high. Further, since silicon group rubber or fluoro rubber having a low damping, is used, the calculation of an eigenvalue of the support system is easy, and the damping effect in a high frequency range is great. Further, by using silicon group rubber or fluoro rubber, the temperature characteristic is stable, and further, the aging effect is low, thereby it is possible to enhance the use life and the reliability.

Figure 14:
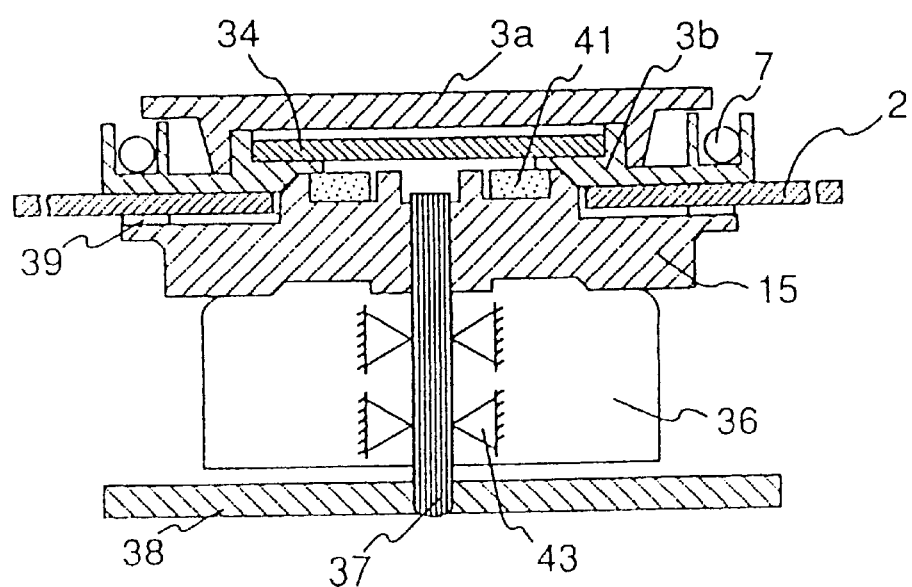
FIG. 14 is a view illustrating another embodiment of the present invention in which an unbalance correcting mechanism is incorporated in a clamper.

FIG. 14 shows another embodiment of the unbalance correcting mechanism. In this embodiment, it is provided in the disc clamper 3, similar to the embodiment shown in FIG. 3.

This embodiment is the same as the embodiment shown in FIG. 3, except that teeth 21 for securing the correcting members (balance balls) are not formed on the calmper holder 4 side, that is, this arrangement corrects the unbalance by using such a principle that the correcting members) are shifted so that the phase thereof is reversed by an angle of 180 deg, with the use of vibration of the support system through the vibration proof legs 13, similar to the aforementioned embodiment.

The effect and the like obtained thereby are similar to those as mentioned above. However, this embodiment exhibits such a disadvantage that a true-circular groove 17 in which the correcting members 7 are set cannot be easily formed with respect to the rotational center.

Figure 15:
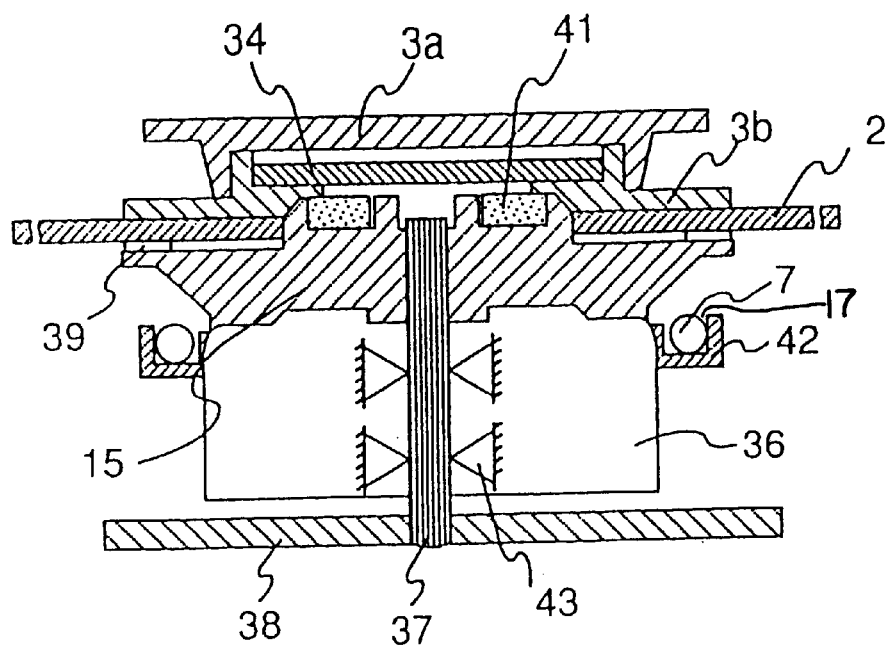
FIG. 15 is a view illustrating further another embodiment of the present invention in which an unbalance correcting mechanism is incorporated in the rotor of a motor.

FIG. 15 is an embodiment in which the unbalance correcting mechanism is provided at a side surface of the rotor 36 of the motor. That is, a ring-like member formed therein with a groove in which the correcting members are set, is fitted in the rotor 36. Specifically, the member 42 having a ring-like groove 17 and the correcting members 7 set in the ring-like groove are incorporated in the rotor 36.

In this case, since a bearing 43 for supporting the shaft 37 is present within the rotor 36, the moment exerted to the shaft 37 can be made to be small, and accordingly, the use life of the bearing 43 can be enhanced. In the case of using fluid as the correcting members 7, the vertical dimensions can be increased so as to increase the cubage of the correcting members 7, and accordingly, it is possible to enhance the effect of correction. Further, the above-mentioned unbalance correcting mechanism may be provided to the shaft 37 which is extended downward from the bearing 43, although it is not shown.

Figure 16:
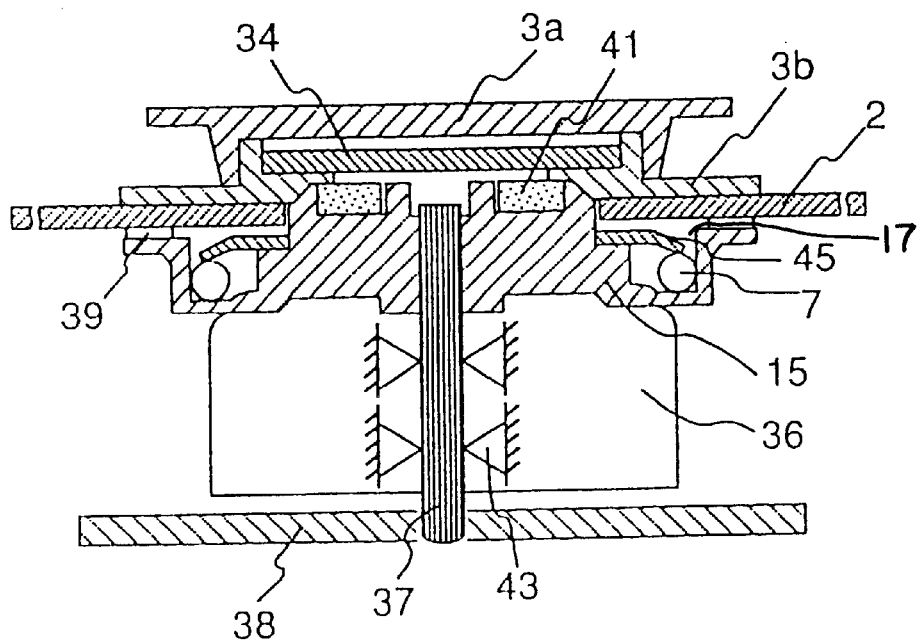
FIG. 16 is a view illustrating an embodiment of the present invention in which a holding member for the correcting bodies are incorporated.

FIG. 16 is a sectional view which shows another embodiment of the present invention. This embodiment is substantially the same as that shown in FIG. 8, except that the unbalance correcting mechanism is incorporated in the turntable 15, including a holding member 45 for holding the correcting members 7. Explanation will be hereinbelow made of the operation and the effect of the holding member 45. The condition shown in this figure, the rotational speed of a disc 2 does not yet reach a resonant point of the rotational support system.

In this embodiment, the holding member 45 is formed of a leaf spring which made of a resilient material, being bent at their outer peripheral part (forward end part). In the range of the rotational speed up to the resonant point, the correcting members 7 are pressed against the rolling groove 17 by means of the leaf spring so as to be held, being prevented from shifting. This pressing force can be about a value which is slightly greater than the rolling resistance between the correcting members 7 and the pathway surface, that is, the contact frictional force.

When the rotational speed of the disc exceeds the resonant point, the centrifugal force caused by the rotation acts upon the forward end of the leaf spring, the bent forward end part thereof starts its deformation in a horizontal direction. Accordingly, the pressing force exerted to the correcting members 7 is eliminated, and accordingly, the correcting members 7 can be freely moved. When the rotational speed exceeds the resonant point, the correcting members 7 is shifted in a direction reverse to the direction of unbalance by an angle of 180 deg., thereby it is possible to correct the unbalance.

Thus, the reason why the correcting members are held before the resonant point, is such that vibration caused by the rolling of the correcting members 7, which generates when passing the resonant point of the rotary support system in the case of a disc speed changing control system (For example, a CD-ROM drive or a DVD-ROM drive using a constant linear speed system) should be restrained. In the case of the constant disc speed control system (for example, an MO drive or a high speed CD-ROM system using an angularly constant system), the rotational speed rapidly rises up since the vibration which is caused by rolling of the correcting members when passing the resonant point of the rotary support system is restrained, similar to that mentioned above. Further, since the correcting members 7 can be released after completely passing the resonant point, and since a force can be prevented from being effected in an unbalance direction but can be effected in only a correcting direction, unbalance of the disc can be stably corrected.

As mentioned above, the disc device according to the present invention, can automatically correct unbalance of the rotary system including unbalance of the disc, and can reduce unbalance vibration caused by the rotary system. With this arrangement, focus errors and tracking errors caused by the unbalance vibration can be restrained, and vibration and noise can also be decreased. Further, a disc device using the unbalance correcting mechanism according to the present invention can aim at increasing the rotational speed of a disc for high speed transmission of data, and at enhancing the degree of accuracy which is required when the density of data is increased to a high value.

What is claimed is:

1. A disc device comprising:

a rotary drive mechanism for rotating a replaceable recording medium, an unbalance correcting mechanism adapted to correct unbalance is incorporated in a rotary body rotating means in said rotary drive mechanism, and comprises a holding system having a holding member for holding said rotary drive mechanism and a head having at least a reproducing function, and a support member composed of resilient members, for supporting a casing and said support member to each other, said holding system having a natural frequency higher than 30 Hz but lower than 70 Hz, and exhibiting a transmission characteristic having a lift-up degree of higher than 8 dB at a resonant point.

2. A disc device as set forth in claim 1, wherein said unbalance correcting mechanism is adapted to be operated at a frequency of rotation higher than a frequency of vibration determined by said holding member holding said rotary drive mechanism including said recording medium.

3. A disc device as set forth in claim 1, wherein said support member supports said holding member at at least three points in the outer peripheral part of the latter, and said resilient members are made of silicon group rubber.

4. A disc device as set forth in claim 1, wherein said support member supports said holding member at at least three points in the outer peripheral part of the latter, and said resilient members are made of fluoro rubber.

5. A disc device as set forth in claim 1, wherein said rotary body rotating means incorporating said unbalance correcting mechanism is a rotary part which is nearer to a motor coil side than a recording medium holding means for holding said recording medium.

6. A disc device as set forth in claim 1, wherein said rotary body rotating means incorporating said unbalance correcting mechanism is a disc clamper or a turntable in a recording medium holding part for holding said recording medium.

7. A disc device incorporating a rotary drive mechanism for rotating a replaceable recording medium, and a head having at least a function of reproducing data, characterized in that said rotary drive mechanism incorporates an unbalance correcting mechanism which is composed of a groove formed in a turntable for carrying thereon said recording medium or a clamper for securing said recording medium, and a plurality of spherical bodies adapted to move in said groove, said rotary drive mechanism and a holding means for holding said head are supported to a casing or a mechanical base by a support means composed of resilient members, said support means having a natural frequency higher than 30 Hz but lower than 70 Hz, and exhibiting a transmission characteristic having a lift-up degree of higher than 8 dB at a resonant point.

* * * * *